United States Patent [19]

Yasue

[11] Patent Number: 5,088,290
[45] Date of Patent: Feb. 18, 1992

[54] TRANSFER VESSEL APPARATUS AND METHOD OF STORING SAMPLES

[75] Inventor: Takao Yasue, Itami, Japan

[73] Assignee: Mitsubishi Denki Kabushiki Kaisha, Japan

[21] Appl. No.: 570,809

[22] Filed: Aug. 22, 1990

[30] Foreign Application Priority Data

May 21, 1990 [JP] Japan ............................ 2-129002

[51] Int. Cl.$^5$ .................................... F25B 9/00
[52] U.S. Cl. .......................... 62/51.1; 62/481; 62/383
[58] Field of Search .................. 62/48.1, 51.1, 383

[56] References Cited

U.S. PATENT DOCUMENTS

| 4,141,224 | 2/1979 | Alger et al. | 62/51.1 |
| 4,198,828 | 4/1980 | Mercier et al. | 62/51.1 |
| 4,300,066 | 11/1981 | Butler | 62/51.1 |
| 4,495,782 | 1/1985 | Salour et al. | 62/51.1 |
| 4,856,297 | 8/1989 | Yasue | 62/51 |

FOREIGN PATENT DOCUMENTS 64-90027  4/1989  Japan .

*Primary Examiner*—Ronald C. Capossela
*Attorney, Agent, or Firm*—Leydig, Voit & Mayer

[57] ABSTRACT

A transfer vessel apparatus has a device for introducing gas from a liquid nitrogen trap into a vessel body to form and maintain an inert atmosphere in the vessel body. The inert atmosphere maintained in the vessel body enables a sample to be stored for long periods and enables transfer of the sample between different vacuum systems.

9 Claims, 2 Drawing Sheets

TRANSFER VESSEL APPARATUS AND METHOD OF STORING SAMPLES

BACKGROUND OF THE INVENTION

1. Field of the Invention

The present invention relates to a transfer vessel apparatus capable of transferring samples between vacuum systems while keeping the samples in a vacuum, and to a method of storing the samples using this apparatus.

2. Description of the Related Arts

A transfer vessel apparatus is used for transferring samples between vacuum systems in which measurements are conducted in a vacuum in order to prevent reaction of samples with oxygen and water or deposition of impurities. Examples of such vacuum systems are photoelectron spectroscopic analyzer, X-ray photoelectron spectroscopic analyzers, molecular ray vapor film forming apparatus, and tunneling microscopes and so forth.

FIG. 1 is a fragmentary sectional view of a conventional transfer vessel apparatus disclosed in Japanese Patent Application Laid-Open No. 1-90027. As shown in this figure, the transfer vessel apparatus has a transfer vessel body 1 (hereinafter referred to as "vessel body") which is a hermetic vessel that can be detachably connected to external vacuum systems (not shown) through a connecting portion 2 which is provided with a shutter and a valve, both of which are not shown. A sample stage 3 carrying the sample 4 is placed in the vessel body 1. A liquid nitrogen trap 6, which is a heat-insulated vessel accommodating a cooling medium such as liquid nitrogen 5 is connected to one side of the vessel body 1 through a connecting portion 7. A heat conductive member 8 made of copper, for example is provided on the liquid nitrogen trap 6. Cooling fins 9 for cooling the atmosphere around the sample 4 without contacting the sample are connected to the heat-conductive member 8. The cooling fins 9 are provided with a sample port 10 through which the sample 4 is moved into the vessel body 1 from a vacuum system and from the vessel body 1 into another vacuum system.

The conventional transfer vessel having the described construction is used to transfer the sample 4 held in the vessel body 1 between the vessel body 1 and the vacuum system. The cooling fins 9 connected to the heat-conductive member 8 is cooled down to a very low temperature, so that the gas around the sample 4 is attracted by the cooling fins 9 by an effect known as the cold trap phenomenon. The atmosphere in the vessel body 1 is initially held at a high vacuum of $10^{-5}$ to $10^{-6}$ Torr. As a result of the cold trap phenomenon, a further enhanced vacuum in $10^{-7}$ Torr or so of the atmosphere sample 4 is produced around the. Consequently, the sample 4 can be transferred by the vacuum transfer vessel apparatus while being kept under an extremely high vacuum between different vacuum systems regardless of the distance.

However, this transfer vessel apparatus has the problems that the vacuum in the vessel body 1 inevitably is reduced when the sample 4 is held in the vessel body for a long time or when the external power source, e.g.,electric power, for the vacuum device fails. As a result, the sample is undesirably oxidized due to contact with oxygen.

SUMMARY OF THE INVENTION

Accordingly, an object of the present invention is to provide a transfer vessel apparatus which can stably store a sample in a hermetic vessel body for a long time, which has simple construction, which does not employ power and which can freely transfer the sample while keeping it in an inert atmosphere without allowing contact with ambient air, as well as a method of storing a sample using this vacuum transfer apparatus. A transfer vessel apparatus according to the present invention comprises a hermetic vessel detachably connected to a vacuum system and accommodating a sample therein, a heat insulated vessel disposed adjacent to the hermetic vessel and containing a cooling medium, a sample cooling member disposed within the hermetic vessel so as to surround the sample and having an end leading into the heat insulated vessel so that the sample is cooled by the cooling medium through the sample cooling member, and means for introducing gas from the cooling medium generated as a result of evaporation in the heat insulated vessel into the hermetic vessel.

According to another aspect of the present invention, a transfer vessel apparatus comprises a hermetic vessel detachably connected to a vacuum system and accommodating a sample, a heat insulated vessel disposed adjacent to the hermetic vessel and containing a cooling medium, a sample cooling member disposed within the hermetic vessel so as to surround the sample and having an end leading into the heat insulated vessel so that the sample is cooled by the cooling medium through the heat conductor, and means for introducing an inert gas into the hermetic vessel. A method according to the present invention of storing a sample by using a transfer vessel apparatus comprises hermetically connecting a hermetic vessel in which a vacuum maintained to a vacuum system, extracting the sample from the vacuum system and placing the sample in the hermetic vessel, cooling the sample by a cooling medium in a heat-insulated vessel adjacent to the hermetic vessel through a heat conductor arranged around the sample, and progressively introducing gas generated as a result of evaporation of the cooling medium into the hermetic vessel so as to build up a pressure substantially the same as or greater than atmospheric pressure and maintaining the pressure.

The above and other objects, features and advantages of the present invention will become clear from the following description of the preferred embodiments when read in conjunction with the accompanying drawings.

DESCRIPTION OF THE PREFERRED EMBODIMENTS

Figure 1:
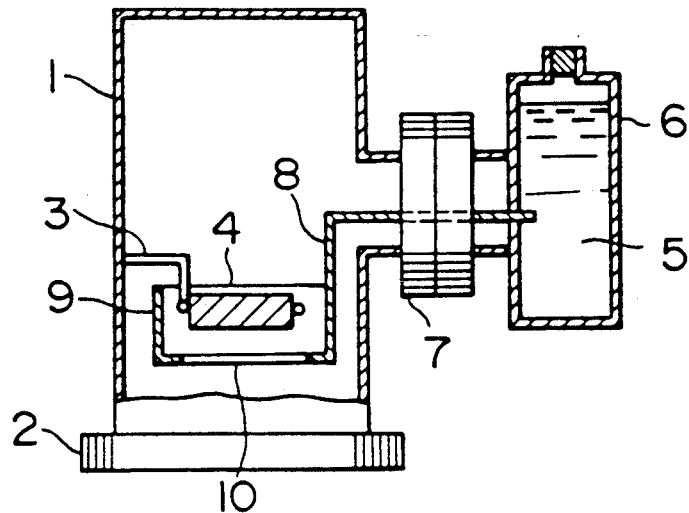
FIG. 1 is a fragmentary sectional view of a conventional transfer vessel apparatus.
Figure 2:
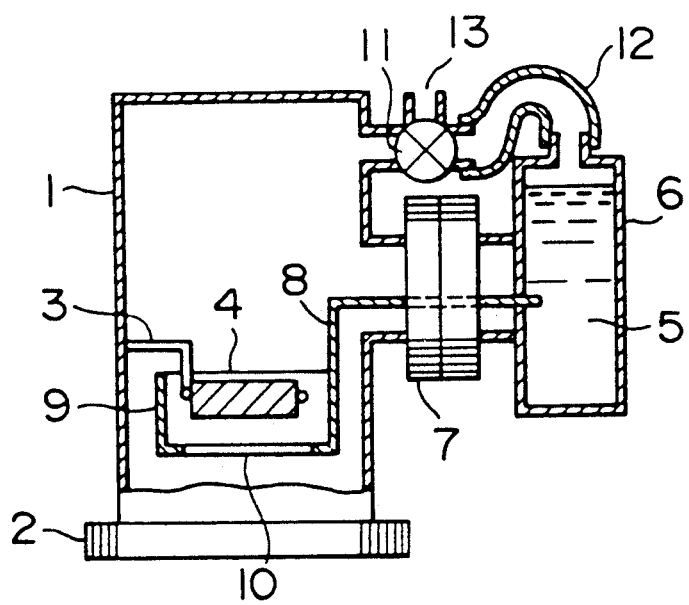
FIG. 2 is a fragmentary sectional view of a transfer vessel apparatus according to an embodiment of the present invention.
Figure 3:
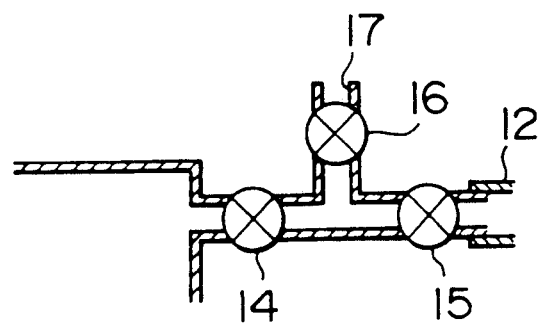
FIG. 3 is a schematic illustration of a nitrogen gas introducing portion of a transfer vessel apparatus according to another embodiment of the present invention.

FIG. 2 is a fragmentary sectional view of an embodiment of the transfer vessel apparatus of the present invention. In this figure, numerals 1 to 10 denote the same parts or members as those used in the conventional transfer vessel apparatus of FIG. 1. In this embodiment, a nitrogen gas introduction valve 11 is provided on an upper portion of the liquid nitrogen trap 6. The arrangement is such that the nitrogen gas which is generated as a result of evaporation of liquid nitrogen is introduced through a connecting guide tube 12 via the nitrogen gas introduction valve 11. The apparatus can have one such nitrogen gas introduction valve 11, there may be or two or three such valves.

The transfer vessel apparatus having the described construction can be connected to vacuum systems (not shown) so as to transfer a sample 4 between these vacuum systems while maintaining a high degree of vacuum around the sample 4, as in a case of the conventional apparatus.

It is assumed here that a high vacuum is established in the vessel body 1 and the cold trap phenomenon is taking place. In this state, the nitrogen gas introduction valve 11 is adjusted to enable the nitrogen gas to escape through an out gas outlet 13. When the sample 4 is to be held in the vessel 1 for a long time or during suspension of operation of the power source of the vacuum device, the vacuum in the vessel body 1 is inevitably degraded as time elapses, with the results that external moisture and other components come into the vessel body 1.

Then, the nitrogen gas introduction valve 11 is adjusted to allow the nitrogen gas from the liquid nitrogen trap 6 to be gradually introduced into the vessel body 1 thereby forming a nitrogen gas atmosphere in the vessel body 1 containing the sample 4. By introducing nitrogen gas such that a pressure higher than atmospheric pressure is maintained in the vessel body 1, it is possible to further prevent invasion by external moisture.

A detailed description will now be given of the operation of the nitrogen gas introducing portion of the apparatus. When a high vacuum is maintained in the vessel body 1, since the liquid nitrogen is always evaporated at normal temperatures, the evaporated nitrogen gas is discharged through the nitrogen gas outlet 17 as the nitrogen gas introduction valve 14 is closed while the nitrogen gas introduction valve 15 and the leak valve 16 are opened, whereby the atmosphere in the connection guide tube 12 is replaced by nitrogen gas. Subsequently, the leak valve 16 is closed and the nitrogen gas introduction valve 4 is progressively opened so that a pressure substantially the same as atmospheric pressure is formed in the vessel body 1. The nitrogen gas may be introduced such that the pressure in the vessel 1 becomes greater than atmospheric pressure. Then, the nitrogen gas introduction valve 14 is closed while the nitrogen gas introduction valve 15 and the leak valve 16 are opened so that the nitrogen gas in the liquid nitrogen trap 6 is discharged to the outside. Consequently, a pressure substantially the same as or greater than atmospheric pressure is maintained within the vessel body 1 even after the evaporation of the liquid nitrogen in the liquid nitrogen trap 6 when the vessel body 1 is left for a long time.

Consequently, the sample 4 in the vessel body 1 is held in an inert gas atmosphere, whereby oxidation of the sample 4 and deposition of water and impurities on the sample 4 can be avoided. Furthermore, since no power source such as that used for a vacuum device used in conventional apparatus is employed, the vacuum vessel 1 can be moved freely while maintaining the inert atmosphere. When the vessel body 1 is connected again to an external vacuum system, a suitable vacuum mechanism such as a vacuum pump is connected to the nitrogen gas outlet 17 so as to discharge the nitrogen gas in the vessel body 1 to establish a high vacuum in the vessel body 1. Then, the vacuum system is connected to the vessel body 1 through the connecting portion 2. Alternatively, the vessel body 1 is directly connected to the vacuum system without being evacuated so that the nitrogen gas in the vessel body 1 is sucked and discharged by the vacuum system connected to the vessel body 1.

Figure 4:
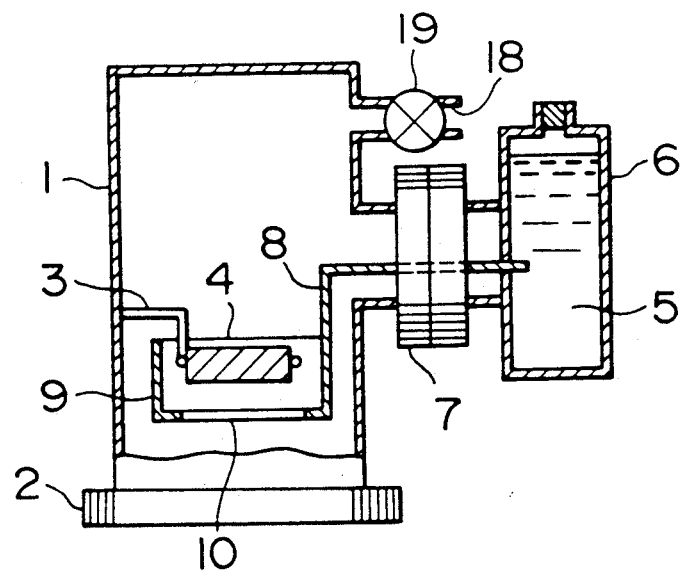
FIG. 4 is a fragmentary sectional view of a transfer vessel apparatus according to still another embodiment of the present invention.

In the embodiment described above, the nitrogen gas is supplied into the vessel body 1 from the liquid nitrogen trap 6. This, however, is only illustrative and the arrangement may be such that, as shown in FIG. 4, an inert gas capable of preventing oxidation of the sample 4, e.g., nitrogen gas, argon gas or helium gas is introduced into the vessel body 1 through the inert gas introduction port 18 via the inert gas introduction valve 19. In this case as well, it is desirable that a pressure higher than atmospheric pressure be formed in the vessel body 1.

What is claimed is:

1. A transfer vessel apparatus comprising:
   a hermetic vessel for housing a sample;
   means for detachably connecting the hermetic vessel to a vacuum system;
   a heat insulated vessel containing a cooling medium;
   a sample cooling member disposed within the hermetic vessel and having a portion extending into the heat insulated vessel and establishing thermal communication between the sample cooling member and the cooling medium; and
   means for introducing gas generated in the heat insulated vessel by evaporation of the cooling medium into the hermetic vessel.

2. A transfer vessel apparatus according to claim 1 wherein the cooling medium comprises liquid nitrogen.

3. An apparatus as claimed in claim 1 wherein the means for introducing gas comprises:
   means for defining a first flow path connected to the hermetic vessel and a second flow path;
   valve means for selectively connecting the heat insulated vessel to one of the flow paths.

4. An apparatus as claimed in claim 3 wherein the second flow path communicates with the outside of the apparatus.

5. A transfer vessel apparatus comprising:
   a hermetic vessel for housing a sample;
   means for detachably connecting the hermetic vessel to a vacuum system;
   a heat insulated vessel containing a cooling medium;
   a sample cooling member disposed within the hermetic vessel and having a portion extending into the heat insulated vessel and establishing thermal communication between the sample cooling member and the cooling medium; and
   means for introducing an inert gas into the hermetic vessel.

6. A transfer vessel apparatus according to claim 5 wherein the inert gas is selected from the group consisting of nitrogen gas, argon gas, and helium gas.

7. A method of storing a sample using a transfer vessel apparatus comprising:

hermetically connecting a hermetic vessel to a vacuum system;

moving a sample from the vacuum system into the hermetic vessel;

disposing a thermal conductor in the hermetic vessel and around the sample;

cooling the thermal conductor with a cooling medium disposed in a heat insulated vessel disposed outside the hermetic vessel; and introducing gas generated by evaporation of the cooling medium in the heat insulated vessel into the hermetic vessel.

8. A method as claimed in claim 7 wherein introducing the gas comprises creating a gas pressure in the hermetic vessel greater than or equal to the ambient pressure on the outside of the hermetic vessel.

9. A method as claimed in claim 7 further comprising releasing gas generated by evaporation of the cooling medium in the heat insulated vessel to the outside of the apparatus.

* * * * *